United States Patent

Ohara

[11] 4,352,984
[45] Oct. 5, 1982

[54] LIGHT BEAM SCANNING DEVICE
[75] Inventor: Yuji Ohara, Asaka, Japan
[73] Assignee: Fuji Photo Film Co., Ltd., Kanagawa, Japan
[21] Appl. No.: 159,276
[22] Filed: Jun. 13, 1980
[30] Foreign Application Priority Data Jun. 15, 1979 [JP] Japan .................................. 54/76164

[51] Int. Cl.³ ............................................. H01J 3/14
[52] U.S. Cl. ...................................... 250/234; 250/201
[58] Field of Search ................ 250/201, 234, 235, 236

[56] References Cited
U.S. PATENT DOCUMENTS 4,140,903  2/1979  Clark ...................... 250/236
4,178,064 12/1979  Mrdjen ................. 250/235 X

*Primary Examiner*—David C. Nelms
*Assistant Examiner*—Darwin R. Hostetter
*Attorney, Agent, or Firm*—Sughrue, Mion, Zinn, Macpeak & Seas

[57] ABSTRACT

A light beam scanning device in which a light beam is scanned over an image or recording surface at a constant velocity independent of beam position and disturbances in the drive to the system. A position detecting device produces a signal representing the position of the light beam over the surface with the light beam being scanned by an optical deflector device. A feedback loop such as a phase-locked loop controls the movement of the optical deflector in response to a signal produced by the position detecting device and a reference signal.

6 Claims, 5 Drawing Figures

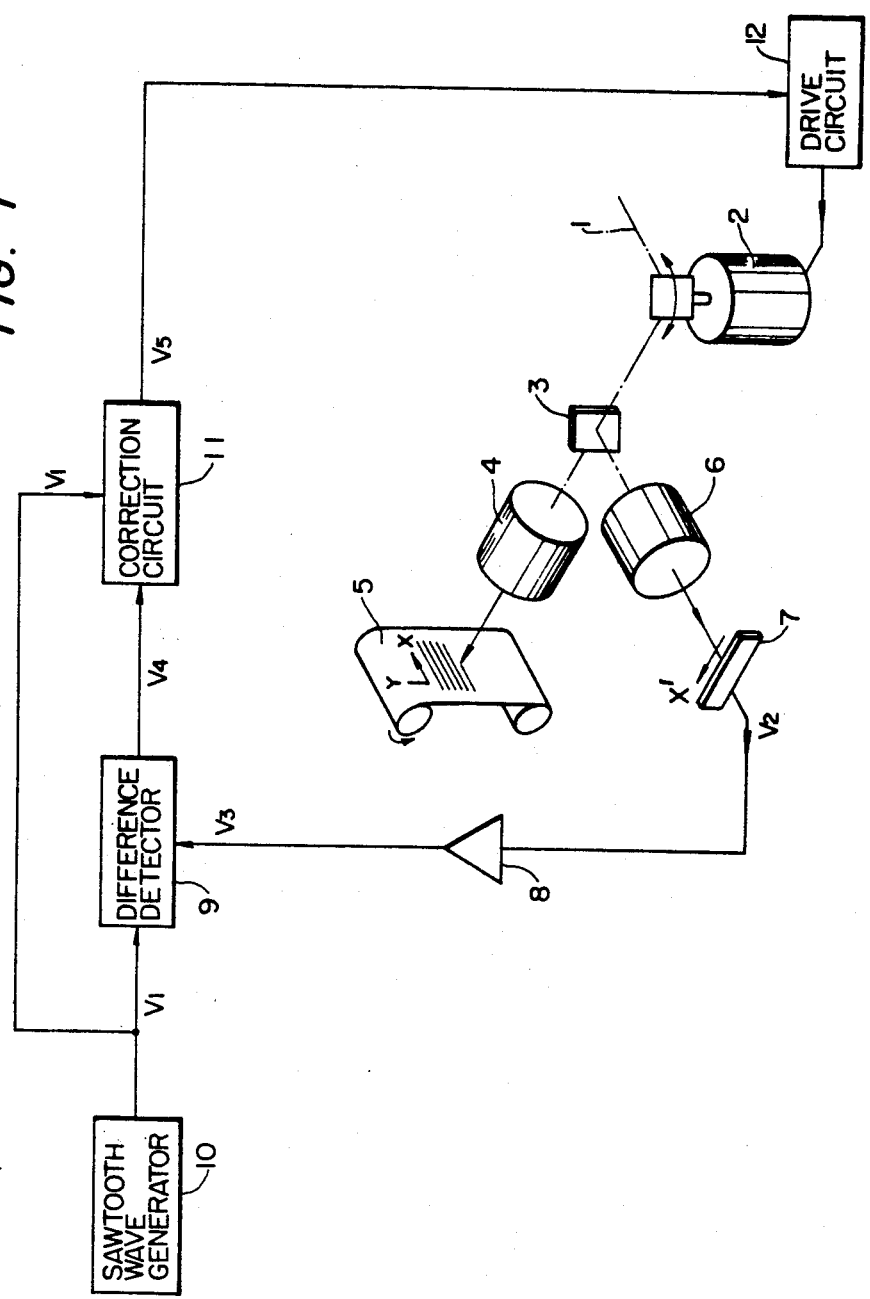

LIGHT BEAM SCANNING DEVICE

BACKGROUND OF THE INVENTION

The present invention relates to a light beam scanning device which is employed in an optical image reading system in which a laser light beam is deflected by an optical deflector to scan an original document and to read the data of the original utilizing photoelectric conversion or an image recording system in which an image is reproduced or various data is recorded by scanning a surface of a recording material with a laser light beam.

In general, it is required that a scanning light beam be deflected at a constant speed along scanning lines such as is required to form an original image on a recording surface. In order to satisfy this requirement, a technique using an F·θ lens or a parabolic mirror has been proposed in the art as disclosed in the Proceeding of the 8th Display Engineering Conference, pages 101 to 104 in a paper entitled "The Fundamental Problems of Scanning Optical System in Laser Recording and Optical Techniques" (presented on Nov. 18, 1977), Japanese Laid Open Patent Application No. 41149/1979 entitled "F·θ Lens", and Japanese Laid Open Patent Application No. 113751/1977 entitled "Light Scanning Device". Furthermore an open-loop control technique has been proposed in which, as disclosed in the specification of Japanese Patent Application No. 147027/1977, a non-linear signal is applied to an optical deflector which has been corrected in advance so that a light beam is scanned at a uniform speed over an image or recording surface.

Unfortunately, the first-mentioned technique is disadvantageous in that an F·θ lens or parabolic mirror is much more expensive than an ordinary photographing lens or a plane mirror. The second-mentioned technique is also disadvantageous in that a circuit for generating the shaped non-linear signal is rather intricate and that the accuracy of the signal is low because no correction can be made for various variational factors such as electrical drift because of the open loop configuration.

Accordingly, an object of the present invention is to provide a light beam scanning device which is simple in construction, low in manufacturing cost and high in accuracy and yet can scan a light beam at a uniform speed.

SUMMARY OF THE INVENTION

The foregoing object and other objects of the invention have been achieved by the provision of a light beam scanning device which, according to the invention, includes means for scanning a light beam over an image or recording surface using an optical deflector, position detecting means for detecting a position, that is, an amount and speed of movement, of the light beam over the surface to be scanned, and a feedback loop for controlling the optical deflector in response to a signal produced by the position detecting means.

Yet further, the foregoing and other objects of the invention have been achieved by a light beam scanning device including first and second feedback loop circuits for controlling optical deflectors which deflect a scanning beam in two directions. Each feedback loop circuit includes a main scanning deflector a portion of the light from which is shone through a linear encoder. The output light from the linear encoder is passed through a condenser lens to an optical detector with the output of the optical detector amplified and coupled to one phase comparison input of a phase comparator circuit. The output of a constant frequency, constant phase pulse generator is coupled to the other input of the phase comparator. The output of the phase comparator is coupled through a low-pass filter and voltage amplifier to the input of a voltage controlled oscillator. The output of the voltage controlled oscillator operates a binary counter the outputs of which are coupled to inputs of a digital-to-analog converter. The output of the digital-to-analog converter is utilized by a drive circuit to operate the scanning deflector.

BRIEF DESCRIPTION OF THE DRAWINGS

FIG. 1 is an explanatory diagram showing the construction of a first embodiment of a light beam scanning device according to the invention.

DESCRIPTION OF THE PREFERRED EMBODIMENTS

Figures 2A, 2B, 2C:
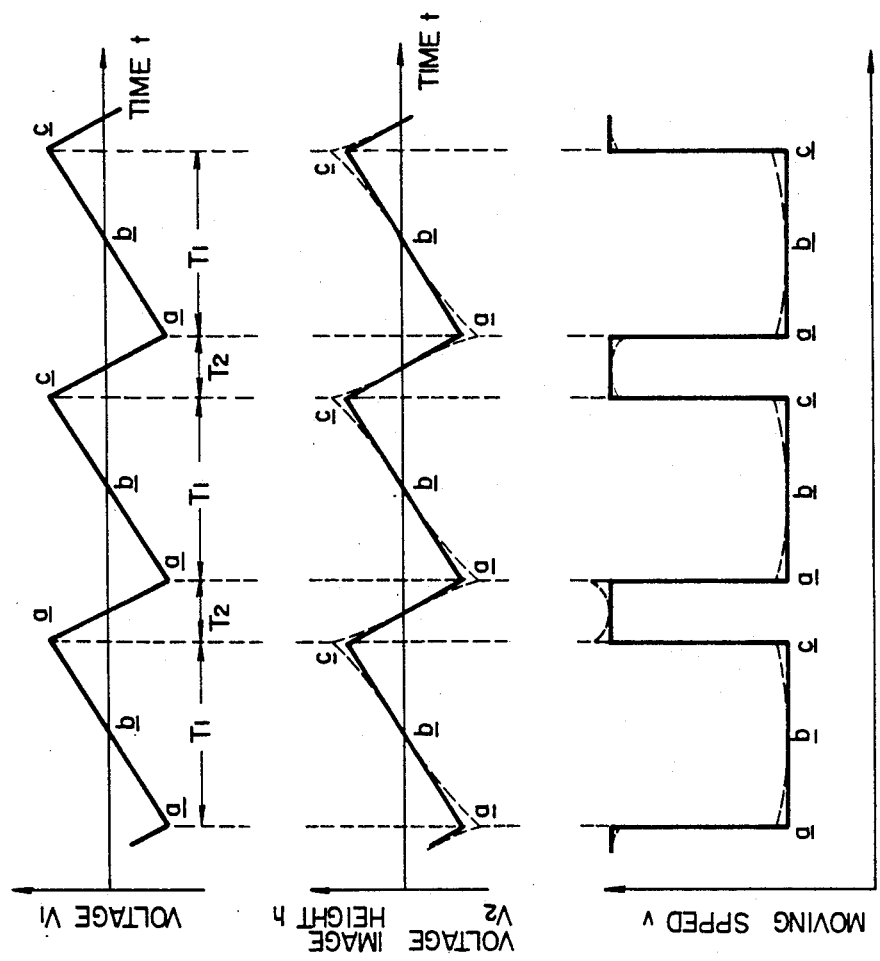
FIGS. 2A, 2B, and 2C are timing charts for a description of the speed of movement of a laser beam in the device of the invention.

FIG. 1 shows the structure of an apparatus constructed in accordance with the teachings of the invention in which a galvanometer type optical deflector is used to scan a recording material with an intensity-modulated laser beam to thereby record a picture image. In FIG. 1, an intensity-modulated recording laser beam and a reference laser beam having a different wavelength from that of the recording laser beam are projected on a common path along an optical axis 1 and are deflected by a galvanometer type optical deflector 2. The two beams are then separated by a beam splitter 3. The recording laser beam is directed to a recording medium 5, is focused by a photographing lens 4 and is scanned in the direction X. The recording medium 5 is moved in the direction Y substantially perpendicular to the direction X so that a picture image is formed on the recording material.

After being reflected by the beam splitter 3, the reference laser beam is directed to an optical spot position detector 7 focused by a photographing lens 6 and is scanned in the direction X'. The optical spot position detector 7 may, for instance, be an LSC series detector manufactured by United Detector Technology Co. which outputs a signal $V_2$ corresponding to the focused spot position of the reference laser beam in the direction X'. The signal $V_2$ is amplified by an amplifier 8 and is then applied as a signal $V_3$ to one input terminal of a difference detecting circuit 9 to the other input terminal of which a reference signal, namely a sawtooth signal $V_1$ from a sawtooth wave generating circuit 10, is applied. A difference signal $V_4$ representative of the difference between the voltage of signals $V_1$ and $V_3$ is provided at the output terminal of the difference detecting circuit 9. The difference detecting circuit 9 can be constituted by an ordinary operational amplifier. The sawtooth wave generating circuit 10 may be a monolithic precision waveform generator in the form of an integrated circuit such as type 8038 manufactured by the Intersil Co. or it may be made up of a crystal oscillator, a counter and a D/A converter if higher precision is required.

The signal $V_1$ from the sawtooth wave generating circuit 10 is applied, as a reference signal, to one input terminal of a correction circuit 11 to the other input terminal of which the difference signal $V_4$ is applied as a correction signal. Thus, a corrected signal, specifically, a galvanometer drive signal $V_5$, is provided at the output terminal of the correction circuit 11. In accordance with the signal voltage $V_5$, a galvanometer drive circuit 12 controls the angle of rotation of the galvanometer type optical deflector 2.

The correction circuit 11 effects, for example, the operation of $V_5 = V_1 - kV_3$ where k is constant. Such a circuit can be readily constructed with an adder or subtracter circuit using an operational amplifier in one input leg to set the factor k. The signal voltage $V_5$ can also be produced by adding or subtracting the differentiation or integral value of $V_3$ or the combination of these two to form the voltage $V_1$. The optical deflector 2 and the drive circuit 12 may, for example, be an optical deflector and drive circuit manufactured by General Scanning Co., Inc. as a Series G-100 OPTICAL SCANNER and an AX-200 Drive Amplifier, respectively.

As is clear from the above operational description, the galvanometer type optical deflector 2 is controlled through a feedback loop which includes the reference laser beam, the photographing lens 6, the optical spot position detector 7, the voltage amplifier 8, the difference detecting circuit 9, the correction circuit 11, the galvanometer drive circuit 12, and the galvanometer type optical deflector 2. The feedback loop operates so that the signal $V_3$ obtained by amplifying the signal $V_2$ from the optical spot position detector 7 is made equal to the signal $V_1$ from the sawtooth wave generating circuit 10, that is, the voltage gradient of the signal voltage $V_3$ is made equal to the constant voltage gradient of the signal voltage $V_1$ and consequently that the focused reference laser beam is scanned at a constant speed on the optical spot position detector 7. As is apparent from the above description of the optical system of the invention, the recording laser beam position on the recording surface 5 corresponds linearly to the reference laser beam on the optical spot position detector 7. Accordingly, it can be readily understood that the recording laser beam is also scanned at a constant speed.

The relationships between the signal voltage $V_1$ of the sawtooth wave generating circuit 10 in FIG. 1, the amount of shift of the focused recording laser beam from the scanning center on the recording material 5, specifically, an image height h and a speed of movement v, will be described with reference to FIGS. 2A and 2B in more detail. FIG. 2A shows the waveform of the signal $V_1$ from the sawtooth wave generating circuit 10. In FIG. 2, reference character $T_1$ designates a scanning period during which an image is recorded on the recording medium 5 with the recording laser beam and reference character $T_2$ designates a flyback period during which the recording laser beam is cut off so that no image is recorded or the intensity of the recording laser beam is reduced to such an extent that it does not affect the formation of an image. In FIGS. 2A, 2B and 2C, reference characters a and c indicate the waveform of the signal $V_1$, image height h and speed of movement v at both ends of each scanning line while reference character b indicates the conditions of the same parameters at the center of each scanning line.

Referring back to FIG. 1, it is assumed for purposes of discussion that the above-described feedback loop is not utilized, that is, that an uncorrected signal $V_1$ from the sawtooth wave generating circuit is directly applied to the galvanometer drive circuit 12 to drive the galvanometer type optical deflector 2. If that were the case, the galvanometer type optical deflector 2 would turn at a constant angular speed $\omega$ during the period $T_1$. As a result, the image height h of the recording laser beam on the recording medium 5 would be $k_1 \tan 2\theta$, wherein $k_1$ is a constant and $\theta = \omega t$, which is the angle of rotation measured from the rotational center of the galvanometer type optical deflector 2 and which is indicated by the broken line in FIG. 2B, while the speed of movement v of the recording laser beam is $k_2 \sec^2 2\theta$ where $k_2$ is a constant which is indicated by the broken line in FIG. 2C. From these diagrams, it may be readily seen that the speed v at both ends of the scanning line would be higher than that at the center of the scanning line.

Now, the case where the feedback loop is formed as shown in FIG. 1 and the corrected signal $V_5$ applied to the galvanometer drive circuit 12 to drive the galvanometer type optical deflector 2 will be described. In FIG. 2B, the image height h of the recording laser beam corresponds to the output signal $V_2$ from the optical spot position detector 7. Since the feedback loop operates so that the voltage gradient of the signal voltage $V_1$ is equal to that of the signal voltage $V_3$ obtained by amplifying the signal voltage $V_2$ as described above, the image height h or the signal $V_2$ is as indicated by the solid line in FIG. 2B. At the same time, the speed v is as indicated by the solid line in FIG. 2C. That is, the speed v remains constant for the two ends and center of the scanning line.

As is apparent from the above description, according to the invention, the laser beam can be readily scanned at a constant speed upon the recording medium. Moreover, it goes without saying that the invention is not limited to the embodiment shown in FIG. 1. For instance, the optical deflector may be replaced by an ultrasonic optical deflector. The opposite mirror surface of the galvanometer type optical deflector 2 may be employed to deflect the reference laser beam. In addition, the photographing lenses 4 and 6 may be replaced by other kinds of lenses or may be arranged in a different manner. Furthermore, the optical spot position detector may be replaced by one of a different type as in a second embodiment of the invention which will be described below. Still further, technical concepts of the invention may be applied to an auxiliary scanning operation and the signals may be processed in a different manner.

Figure 3:
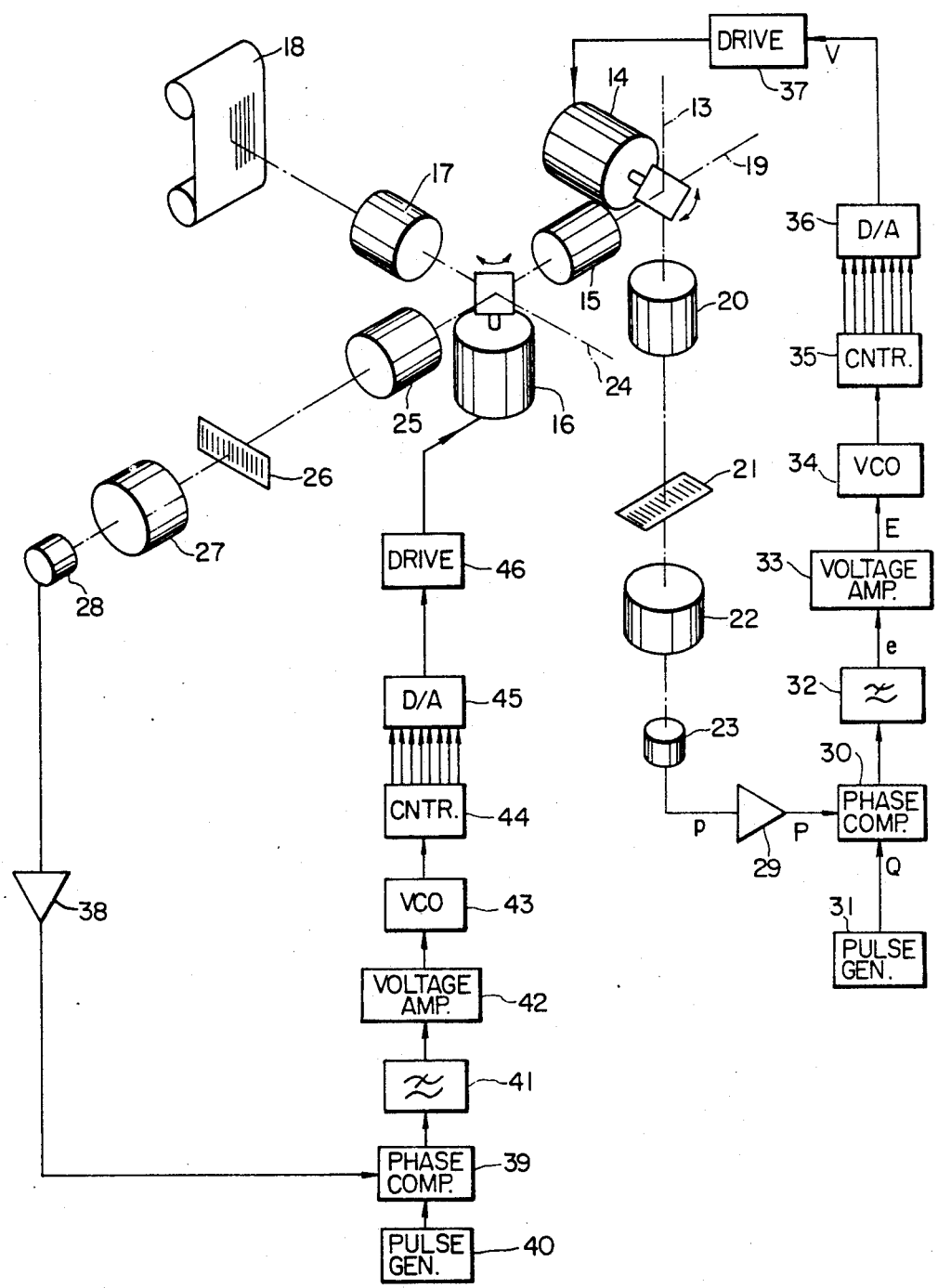
FIG. 3 is an explanatory diagram showing the construction of a second embodiment of a light beam scanning device of the invention.

A second embodiment of the invention will be described with reference to FIG. 3. FIG. 3 shows the arrangement of a scanning apparatus which uses a galvanometer type optical deflector to two-dimensionally scan a recording material with an intensity modulated laser beam thereby to form a picture thereon and in which a phase-locked loop, hereinafter referred to merely as "a PLL" when applicable, is employed as the feedback loop controlling the galvanometer type optical deflector.

In FIG. 3, an intensity-modulated recording laser beam 13, after being deflected by a main scanning galvanometer type optical deflector 14, is applied through a first lens 15 to an auxiliary scanning galvanometer type optical deflector 16 which further deflects the laser beam substantially perpendicularly to the direction of deflection of the main scanning galvanometer optical deflector 14. The recording laser beam thus deflected is focused by a second lens 17 and scanned two-dimensionally on a recording medium 18 to form a picture image thereon.

A main scanning reference laser beam 19 is applied to the mirror surface of the main scanning galvanometer type optical deflector 14 opposite to the mirror surface to which the recording laser beam is applied. As a result, the reference laser beam 19 is deflected thereby, focused by a third lens 20 and scanned upon a main scanning linear encoder 21. The main scanning linear encoder 21 has a pattern of stripes formed of metal chrome. More specifically, the stripe pattern is constituted by a number of transparent stripes and a number of opaque stripes which are arranged alternately. The width of each transparent stripe is substantially equal to the diameter of the main scanning reference laser beam focused on the surface of the pattern of the linear encoder 21. The main scanning reference laser beam passing through the transparent stripes is condensed by a first condenser lens 22 and is then applied to a first optical detector 23 which may, for example, be a photomultiplier tube or a photodiode.

An auxiliary scanning reference laser beam 24 is applied to the other mirror surface of the auxiliary scanning galvanometer type optical deflector 16 opposite to the mirror surface to which the recording laser beam 13 is applied. As a result, the reference laser beam 24 is deflected thereby, is then focused by a fourth lens 25, and scanned over an auxiliary scanning linear encoder 26 which has a stripe pattern similar to that of the main scanning linear encoder 21. The auxiliary scanning reference laser beam 24 after it has passed through the transparent stripe of the auxiliary scanning linear encoder 26 is condensed by a second condenser lens 27 and is then applied to a second optical detector 28.

When the main scanning linear encoder 21 is scanned with the main scanning reference laser beam 19 deflected by the main scanning galvanometer type optical deflector 21, the first optical detector 23 outputs a train of photoelectric pulses P which is amplified by a voltage amplifier 29 and is then applied to one input terminal of a phase comparator 30 to the other input terminal of which a train of reference pulses Q having a regular pulse interval and which are generated by a pulse generator 31 such as a crystal oscillator is applied. The phase comparator 30 operates to detect the direction and magnitude of the phase difference between each pulse in the train of photoelectric pulses P and each pulse in the train of reference pulses Q. The phase difference is outputted as a DC difference voltage e through a low-pass filter 32 coupled to the phase comparator 30. The DC difference voltage e is amplified by a voltage amplifier 33 with a gain such that the range of variation of the DC difference voltage e matches the range of input of a voltage-controlled oscillator 34 connected to the voltage amplifier. A bias voltage is superposed on the DC difference voltage thus amplified resulting in a DC voltage E outputted by the voltage amplifier 33. The voltage-controlled oscillator 34 operates to output a train of pulses the number of which is changed according to the magnitude of the DC voltage E. The pulses of the train of pulses thus produced are counted by a binary counter 35 the bit output terminals of which are connected to corresponding bit input terminals of a digital-to-analog (D/A) converter 36. A DC voltage v corresponding in magnitude to the binary value of the bit outputs of the counter 35 is provided at the output terminal of the D/A converter 36. The DC voltage V is applied to a galvanometer drive circuit 37. The galvanometer drive circuit 37 operates to control the angle of rotation of the main scanning galvanometer type optical deflector 14 according to the DC voltage V thus applied.

As is clear from the above description, the main scanning galvanometer type optical deflector 14 is controlled in a phase-locked loop (PLL) which is made up of the main scanning reference laser beam 19, the third lens 20, the main scanning linear encoder 21, the first condenser lens 22, the first optical detector 23, the voltage amplifier 29, the phase comparator 30, the pulse generator 31, the low-pass filter 32, the voltage amplifier 33, the voltage-controlled oscillator 34, the counter 35, the D/A converter 36, the galvanometer drive circuit 37 and the main scanning galvanometer type optical deflector 14. The PLL operates so that the pulses of the train of reference pulses Q from the pulse generator 31 is in phase with the pulses of the train of photoelectric pulses P which are outputted by the first optical detector 23 and subjected to voltage amplification, that is, the phase difference between the reference pulses Q and the photoelectric pulses P is constant. The train of reference pulses Q is regular and constant in pulse interval. Therefore, the main scanning reference laser beam 19 is scanned at a constant speed over the main scanning linear encoder 21.

It can be readily understood that, if ordinary photographing lenses are employed as the first, second and third lenses 15, 17 and 20 so that the position and speed of the recording laser beam 13 over the recording material 18 correspond linearly to those of the main scanning reference laser beam 19 over the main scanning linear encoder 21, then the recording laser beam 13 will be scanned at a constant speed in the main scanning direction over the recording material 18.

For the auxiliary scanning operation also, a phase-locked loop (PLL) similar to the PLL for the main scanning operation is made up of the auxiliary scanning reference laser beam 24, the fourth lens 25, the second condenser lens 27, the second optical detector 28, a phase comparator 39, a pulse generator 40, a low-pass filter 41, a voltage amplifier 42, a voltage-controlled oscillator 43, a counter 44, a D/A converter 45, a galvanometer drive circuit 46 and the auxiliary scanning galvanometer type optical deflector 16. Therefore, it can be readily understood that the recording laser beam 13 is scanned at a constant speed in the auxiliary scanning direction upon the recording medium 18.

As is apparent from the above-description, in the second embodiment of the invention, the main scanning galvanometer type optical deflector and the auxiliary scanning galvanometer type optical deflector are controlled by two phase-locked loops in such a manner that the recording laser beam is scanned at constant speeds two-dimensionally over the recording medium.

In the second embodiment, the first through fourth lenses 15, 17, 20 and 25 may be ordinary photographing lenses and the components of the various electronic circuits forming the phase-locked loops can be constituted by well-known semiconductor devices. Thus, the light beam scanning device according to the invention can be manufactured at low cost. Furthermore, the operation of the light beam scanning device according to the second embodiment of the invention is considerably stable. That is, its performance is maintained high at all times even if undesirable disturbances such as variations of the supply voltage or drift due to temperature change are present.

In the second embodiment, the signals in the PLL are processed after being converted into digital signals.

Therefore, for instance, the flyback and standby operations effected by the galvanometer type optical deflectors can be controlled by means of a microcomputer or the like provided outside the light beam scanning device.

In the above-described first and second embodiments, the lenses in the optical system may be lenses other than ordinary photographing lenses with the recording laser beam scanned over the recording medium at constant speeds. Therefore, these embodiments are advantageous in that, in the case where data is received from an external device to be recorded on a recording medium, a train of clock pulses of constant pulse interval can be employed and no difference in optical irradiation due to scanning speed differences occurs in any part of the recording medium and therefore exposure is effected uniformly.

The technical concept of the invention can of course be applied to the case also where a picture image is read with a scanning operation. In this case effects as well advantageous in the above-described embodiments are obtained.

What is claimed is:

1. A light beam scanning device comprising: a light beam comprised of a main laser beam and a reference laser beam having a different wavelength from that of said main laser beam, said main laser beam and said reference laser beam being projected along a common path; means for scanning said light beam over a surface; position detecting means responsive to said reference laser beam for detecting a position of said light beam over said surface to be scanned; and feedback loop means for controlling said optical deflector in response to a signal outputted by said position detecting means to cause said light beam to scan said surface to be scanned at a constant 2. The light beam scanning device of claim 1 wherein said feedback loop comprises means for amplifying said signal outputted by said position detecting means; a difference detector to one input of which an output of said amplifying means is coupled; a sawtooth wave generator having an output coupled to a second input of said difference detector; a correction circuit having a first input coupled to an output of said difference detector and a second input coupled to said output of said sawtooth wave generator; and a drive circuit for operating said scanning means operating in response to an output of said correction circuit.

3. A light beam scanning device comprising: means for scanning a light beam over a surface in a first direction; first position detecting means for detecting a position of said light beam over said surface; a first phase comparator having a first input coupled to receive an output signal produced by said first position detecting means; a first pulse generator producing pulses of a constant frequency, an output of said first pulse generator being coupled to a second input of said first phase comparator; a first low-pass filter having an input coupled to an output of said first phase comparator; a first voltage amplifier having an input coupled to an output of said first low-pass filter; a first voltage controlled oscillator having an input coupled to an output of said first voltage amplifier; a first binary counter having a count input coupled to an output of said first voltage controlled oscillator; a first digital-to-analog converter having binary inputs coupled to corresponding outputs of said first counter; a first drive circuit having an input coupled to an output of said digital-to-analog converter and having an output coupled to operate said first scanning means; second position detecting means for detecting the position of said light beam over said surface in a second direction; a second phase comparator having a first input coupled to receive an output signal from said second position detecting means; a second pulse generator producing pulses of constant frequency, an output of said pulse generator being coupled to a second input of said second phase comparator; a second low-pass filter having an input coupled to an output of said second phase comparator; a second voltage amplifier having an input coupled to an output of said second low-pass filter; a second voltage controlled oscillator having an input coupled to an output of said second voltage amplifier; a second binary counter having a count input coupled to an output of said second voltage controlled oscillator; a second digital-to-analog converter having binary inputs coupled to corresponding binary outputs of said second counter; a second drive circuit having an input coupled to an output of said digital-to-analog converter and having an output coupled to operate said second scanning means.

4. The light beam scanning device of claim 3 wherein said first and second position detecting means each comprise a linear encoder, at least one lens, and an optical detector.

5. The light beam scanning device of claim 1 wherein said light beam comprises a main laser beam and a reference laser beam having a different wavelength from that of said main laser beam, said main laser beam and said reference laser beam being projected along a common path.

6. The light beam scanning device of claim 1 or 3 wherein said scanning means comprises a beam splitting mirror and a galvanometer drive operatively coupled to said beam splitting mirror.

* * * * *